United States Patent
Schmalenberg et al.

(10) Patent No.: US 9,274,222 B1
(45) Date of Patent: Mar. 1, 2016

(54) DYNAMIC ALLOCATION OF RADAR BEAMS IN AUTOMOTIVE ENVIRONMENTS WITH PHASED ARRAY RADAR

(71) Applicant: Toyota Motor Engineering & Manufacturing North America, Inc., Erlanger, KY (US)

(72) Inventors: Paul Donald Schmalenberg, Ann Arbor, MI (US); Tsuyoshi Nomura, Ann Arbor, MI (US); Jae Seung Lee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 458 days.

(21) Appl. No.: 13/783,586

(22) Filed: Mar. 4, 2013

(51) Int. Cl.
  *G01S 13/93* (2006.01)
  *G08G 1/16* (2006.01)

(52) U.S. Cl.
  CPC .............. *G01S 13/931* (2013.01); *G08G 1/167* (2013.01)

(58) Field of Classification Search
  CPC ................ G08G 1/167; G01S 13/4463; G01S 13/91–13/92; G01S 13/93–13/931
  USPC ................ 342/27, 70–72, 360, 368, 371, 372
  See application file for complete search history.

(56) References Cited

U.S. PATENT DOCUMENTS

| | | | |
|---|---|---|---|
| 4,158,841 A * | 6/1979 | Wuchner et al. ................. 342/71 |
| 5,266,955 A * | 11/1993 | Izumi et al. ..................... 342/70 |
| 5,515,059 A * | 5/1996 | How et al. ...................... 342/372 |
| 5,745,070 A | 4/1998 | Yamada |
| 5,754,099 A * | 5/1998 | Nishimura et al. ............ 340/435 |
| 5,955,967 A * | 9/1999 | Yamada ......................... 340/904 |
| 5,977,904 A * | 11/1999 | Mizuno et al. ................... 342/70 |
| 6,828,928 B2 * | 12/2004 | Dubrovin ......................... 342/70 |
| 6,862,527 B2 * | 3/2005 | Okamura et al. ............. 701/301 |
| 7,132,976 B2 * | 11/2006 | Shinoda et al. .................. 342/70 |
| 7,400,290 B2 | 7/2008 | Woodington et al. |
| 7,417,585 B2 | 8/2008 | Yamagami et al. |
| 7,661,856 B2 * | 2/2010 | Nakamura et al. ............ 362/465 |
| 8,847,792 B2 * | 9/2014 | Tsunekawa ................... 340/933 |
| 2002/0014988 A1 * | 2/2002 | Samukawa et al. ............. 342/70 |
| 2003/0122704 A1 * | 7/2003 | Dubrovin ......................... 342/70 |
| 2003/0179130 A1 * | 9/2003 | Kumon et al. ................... 342/70 |
| 2004/0119634 A1 * | 6/2004 | Samukawa et al. ............. 342/70 |
| 2004/0257556 A1 * | 12/2004 | Samukawa et al. ........... 356/4.01 |
| 2005/0140541 A1 * | 6/2005 | Yamagami et al. ............. 342/70 |
| 2005/0179580 A1 * | 8/2005 | Cong et al. ...................... 342/70 |
| 2005/0225477 A1 * | 10/2005 | Cong et al. ...................... 342/70 |
| 2006/0001566 A1 * | 1/2006 | Maass .............................. 342/70 |
| 2007/0008211 A1 * | 1/2007 | Yamano et al. .................. 342/70 |
| 2007/0010937 A1 * | 1/2007 | Sakuma ......................... 701/200 |
| 2007/0219720 A1 * | 9/2007 | Trepagnier et al. ........... 701/300 |

(Continued)

*Primary Examiner* — Peter Bythrow
(74) *Attorney, Agent, or Firm* — Dinsmore & Shohl LLP

(57) ABSTRACT

A radar apparatus that focuses a subset of transmit beams within a field of view (FOV) is provided. The radar apparatus has a phased array transmitter that is operable to generate a transmit beam within the FOV, and a phased array receiver that is operable to receive a receive beam reflected from within the FOV. The apparatus also has a radar controller with an electronic circuit and electronic memory, the electronic memory having a plurality of pre-calculated beam density curves. The radar controller is operable to execute each of the plurality of pre-calculated beam density curves and steer at least one transmit beam generated from a particular executed beam density curve towards a sub-area of the FOV.

14 Claims, 6 Drawing Sheets

(56) References Cited

U.S. PATENT DOCUMENTS

2007/0222662 A1* 9/2007 Toennesen et al. ............ 342/27
2008/0169966 A1* 7/2008 Tsuchihashi et al. .......... 342/70
2011/0227781 A1* 9/2011 Nitanda .......................... 342/70
2012/0274501 A1 11/2012 Kuwahara et al.
2012/0290184 A1* 11/2012 Suzuki ............................ 701/93

* cited by examiner

DYNAMIC ALLOCATION OF RADAR BEAMS IN AUTOMOTIVE ENVIRONMENTS WITH PHASED ARRAY RADAR

BACKGROUND OF THE INVENTION

The use of radar systems on motor vehicles, for example, for collision avoidance and other applications, is known. Such radar systems typically transmit radar beams directly in front of a traveling motor vehicle and/or directly to the side of the vehicle in order to provide information on blind spots. However, heretofore radar systems do not accommodate when the motor vehicle is traveling along a curved road. Therefore, a radar apparatus that can focus a subset of radar beams within a field of view (FOV) and at an angle from a projected longitudinal center line of the motor vehicle would be desirable.

SUMMARY OF THE INVENTION

A radar apparatus that focuses a subset of transmit beams within a field of view (FOV) is provided. The radar apparatus has a phased array transmitter that is operable to generate a transmit beam within the FOV, and a phased array receiver that is operable to receive a receive beam reflected from within the FOV. The apparatus also has a radar controller with an electronic circuit and electronic memory, the electronic memory having a plurality of pre-calculated beam density curves. The radar controller is operable to execute each of the plurality of pre-calculated beam density curves and steer at least one transmit beam generated from a particular executed beam density curve towards a sub-area of the FOV.

In some instances, the phased array transmitter transmits a plurality of transmit beams within the FOV as a function of the executed beam density curve, and the radar controller steers a subset of the plurality of transmit beams towards the sub-area within the FOV. The subset of steered transmit beams are generated from the executed beam density curve and provide an increased beam density at the sub-area. The sub-area within the FOV can be an area of a curved road in front of a motor vehicle traveling on the road, an entrance into an enclosed area, an exit from an enclosed area, a particular area on an airport runway, and the like.

In some instances, the radar apparatus has a beam density optimizer algorithm that is operable to calculate a beam density distribution for the sub-area within the FOV. Although not required, the beam density optimizer algorithm is contained within the radar controller.

In other instances, the FOV can be divided into a plurality of zones by the radar controller and the beam density optimizer algorithm has a weighting function that provides a weight or a weighted value to a first subset of the plurality of zones that is higher than a weight applied or assigned to a second subset of the plurality of zones. In addition, the executed beam density curve can be a function of the weighted value of first subset of FOV zones. Finally, the first subset of field zones can have a target identified by the radar apparatus.

The radar controller executes a beam density curve and the phased array transmitter transmits a first subset of transmit beams evenly across the FOV and a second subset of transmit beams directed only to the first subset of FOV zones. In the alternative, the phased array transmitter transmits a first subset of transmit beams directed to the first subset of FOV zones and a second subset of transmit beams evenly across the FOV. In some instances, the first subset of FOV zones cover a curved portion of a road that the motor vehicle is traveling on, the curved portion located in front of the motor vehicle at an angle, not equal to zero, from a projected longitudinal center line of the motor vehicle. In addition, the radar controller executes the particular beam density curve as a function of a yaw rate of the motor vehicle. Also, the pre-calculated beam density curves can correspond to different radii curved roads that the motor vehicle can or is traveling on.

A process for operating a motor vehicle radar apparatus in order to focus radar beams on a forward area of a curved road that the motor vehicle is traveling on is also provided. The process includes determining a yaw rate of the motor vehicle traveling along the curved road and executing a beam density curve as a function of the determined yaw rate. Thereafter, a plurality of transmit beams corresponding to the executed beam density curve is transmitted with a first subset of the transmitted beams directed evenly across a FOV of the radar apparatus and a second subset of the transmitted beams directed to a selected sub-area of the FOV that is not directly in front of the motor vehicle.

The process can also include the radar apparatus detecting a target within one or more sub-areas of the radar FOV and executing a beam density curve as a function of the one or more sub-areas where the target is located. Thereafter, a first subset of transmit beams is directed evenly across the radar FOV and a second subset of transmitted beams is directed to the one or more sub-areas.

DETAILED DESCRIPTION OF THE INVENTION

A radar apparatus for focusing and/or steering radar beams towards a sub-area of a field of view (FOV) of the radar apparatus is provided. As such, the apparatus has utility as a safety component for a motor vehicle, security system, and the like.

The radar apparatus has a phased array transmitter and a phased array receiver. The phased array transmitter is operable to generate and/or propagate a transmit beam within the FOV and the phased array receiver is operable to receive a receive beam reflected from within the FOV.

A radar controller is also included and has an electronic circuit and an electronic memory. In some instances, the electronic memory has a plurality of pre-calculated beam density curves. Furthermore, the radar controller is operable to execute each of the plurality of pre-calculated beam density curves and steer at least one transmit beam generated from a particular executed beam density curve towards a sub-area of the FOV. It is appreciated that with the stored pre-calculated beam density curves, computation time is reduced and computational efficiency is increased for the radar apparatus.

A beam density optimizer may or may not be included as part of the radar apparatus, the beam density optimizer operable to calculate a beam density distribution for the FOV in which a desired sub-area has a relatively high transmit beam density with respect to the remaining FOV. The beam density optimizer may or may not have a weighting function that is operable to assign a weight or weight value to a first subset of sub-areas or zones of the FOV that is higher or greater than a weight or weight value that the weighting functions assigns to a second subset of sub-areas or zones of the FOV. Furthermore, a particular beam density curve is executed by the radar controller as a function of the weighting of the first and/or second subset of FOV zones.

The radar apparatus can be part of and/or attach to a motor vehicle and provide for greatly improved resolution for particular areas in proximity of the motor vehicle that are not currently available with prior art radar systems. For example and for illustrative purposes only, the radar apparatus steers a plurality of transmit beams to cover a portion of a curved road that is in front of a motor vehicle and located at an angle from a projected longitudinal center line of the vehicle. In this manner, low radar resolution for curved portions of roads, highways, etc. that are in front of a traveling vehicle is replaced by a high resolution "viewing".

Figure 1A:
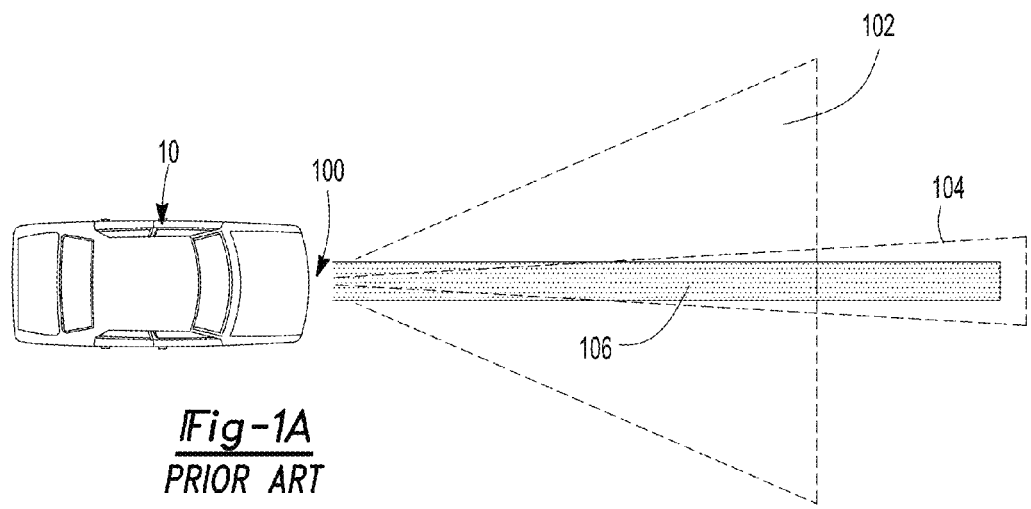
FIG. 1A is a schematic illustration of a prior art radar apparatus.
Figure 1B:
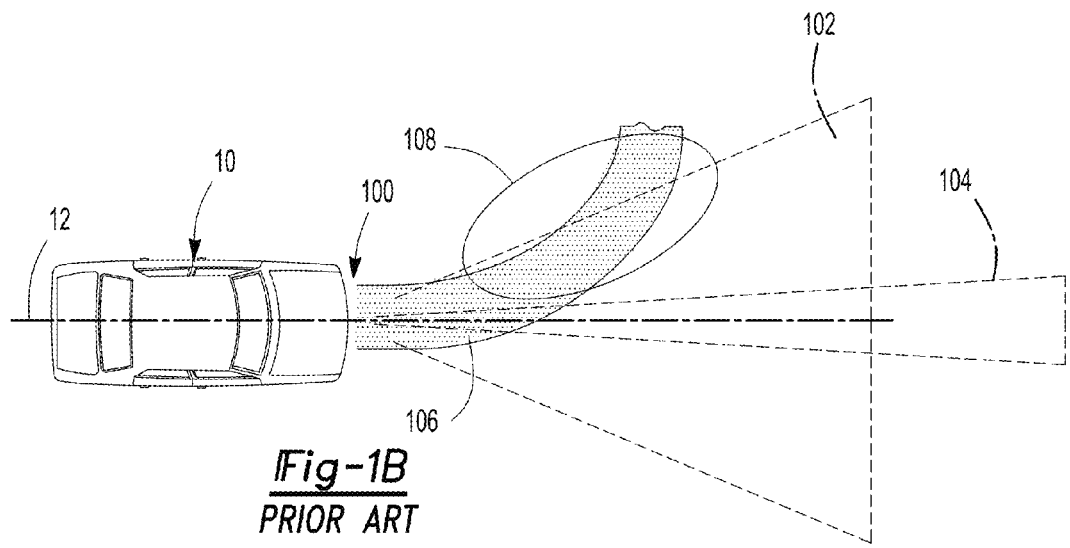
FIG. 1B is a schematic illustration of the prior art radar apparatus shown in FIG. 1A when a motor vehicle is traveling along a curved road.

Turning now to FIG. 1, FIG. 1A schematically illustrates a motor vehicle 10 traveling along a straight portion of a road 106. The vehicle 10 has a prior art radar apparatus 100 that provides a wide angle, low resolution FOV 102 in combination with a low angle, high resolution FOV 104 in front of the vehicle 10 as it travels along the road 106. As shown in FIG. 1B, when the motor vehicle 10 travels along a curved portion of the road 106, a sub-area 108 in front of the vehicle 10 is not subjected or covered by the low angle, high resolution FOV 104. As such, the radar apparatus 100 is not capable of providing high radar resolution within the sub-area 108 located at an angle in front of the vehicle 10 as it travels along the road 106.

Figure 2:
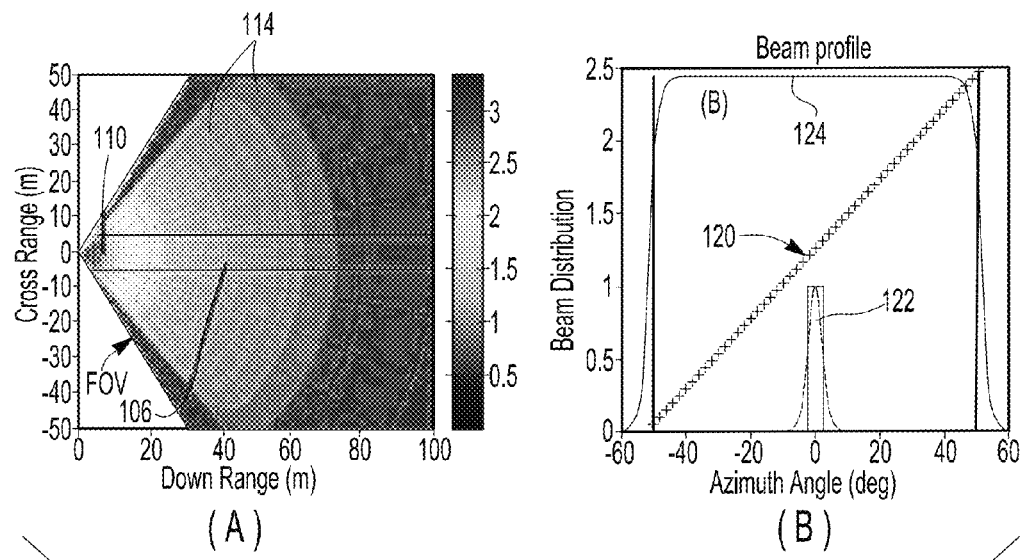
FIG. 2 is a graphical representation of: (A) a radar resolution map for a field of view (FOV) of a radar apparatus; and (B) a beam distribution as a function of angle within the FOV.

Turning now to FIG. 2, FIG. 2A a resolution map with a FOV superimposed onto a straight portion of the road 106. Also shown within the resolution map is a high resolution area 110. Such a resolution map is provided by a beam distribution as shown in FIG. 2B in which the location of transmit beams as a function of angle in front of the radar apparatus is shown at 120. It is appreciated that, the density of beams as a function of angle is linear as represented by the beam distribution curve 120. Also shown in FIG. 2B is a beam distribution curve 122 for a single beam at 0 degrees and an overall beam distribution profile 124 over the entire FOV.

Figure 3:
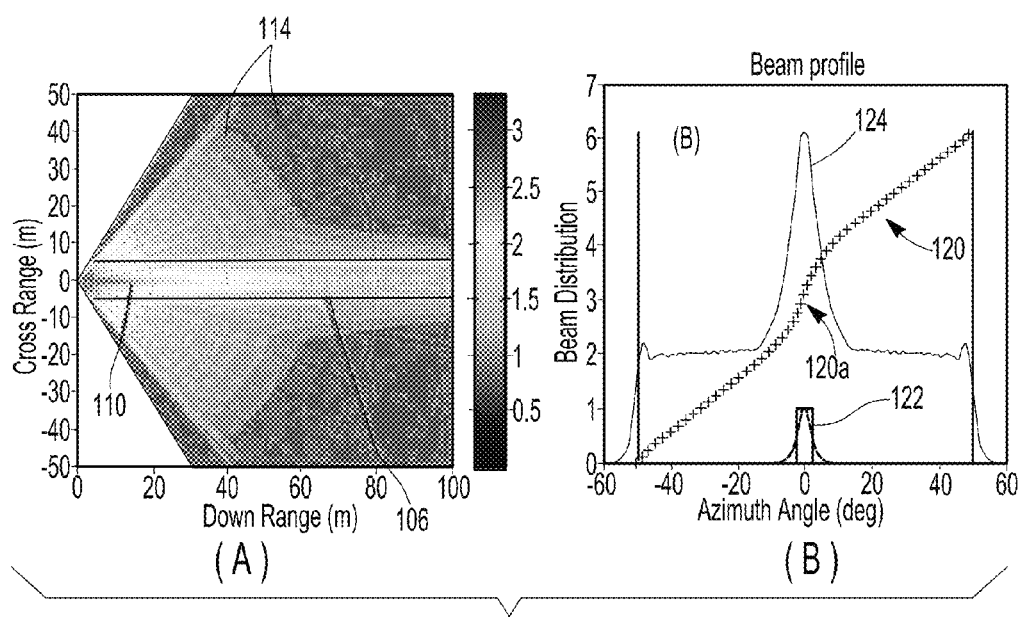
FIG. 3 is a graphical representation of: (A) a radar resolution map with increased resolution along a straight road; and (B) a beam distribution versus angle that provides the increased resolution shown in (A)

In contrast to the resolution map and beam density profile 124 shown in FIG. 2, FIGS. 3A and 3B illustrate a resolution map and beam density profile 124 for a radar apparatus according to an embodiment of the present invention. As stated above, the radar apparatus can steer one or more transmit beams and provide a relatively high density of transmit beams directed to a desired sub-area of the FOV. In particular, the high resolution area 110 is projected along the straight portion of road 106 to a greater length when compared to FIG. 2A, which is accomplished by steering an increased number of transmit beams within +/−10 degrees from 0. With respect to the beam distribution curve 120 shown on FIG. 3B, the region 120a has a greater slope compared to the remainder of the curve 120 and thus graphically illustrates the higher density of transmit beams within the +/−10 degree region. In addition, the corresponding overall beam distribution profile 124 reflects the increased transmit beam density within this region.

Figure 4:
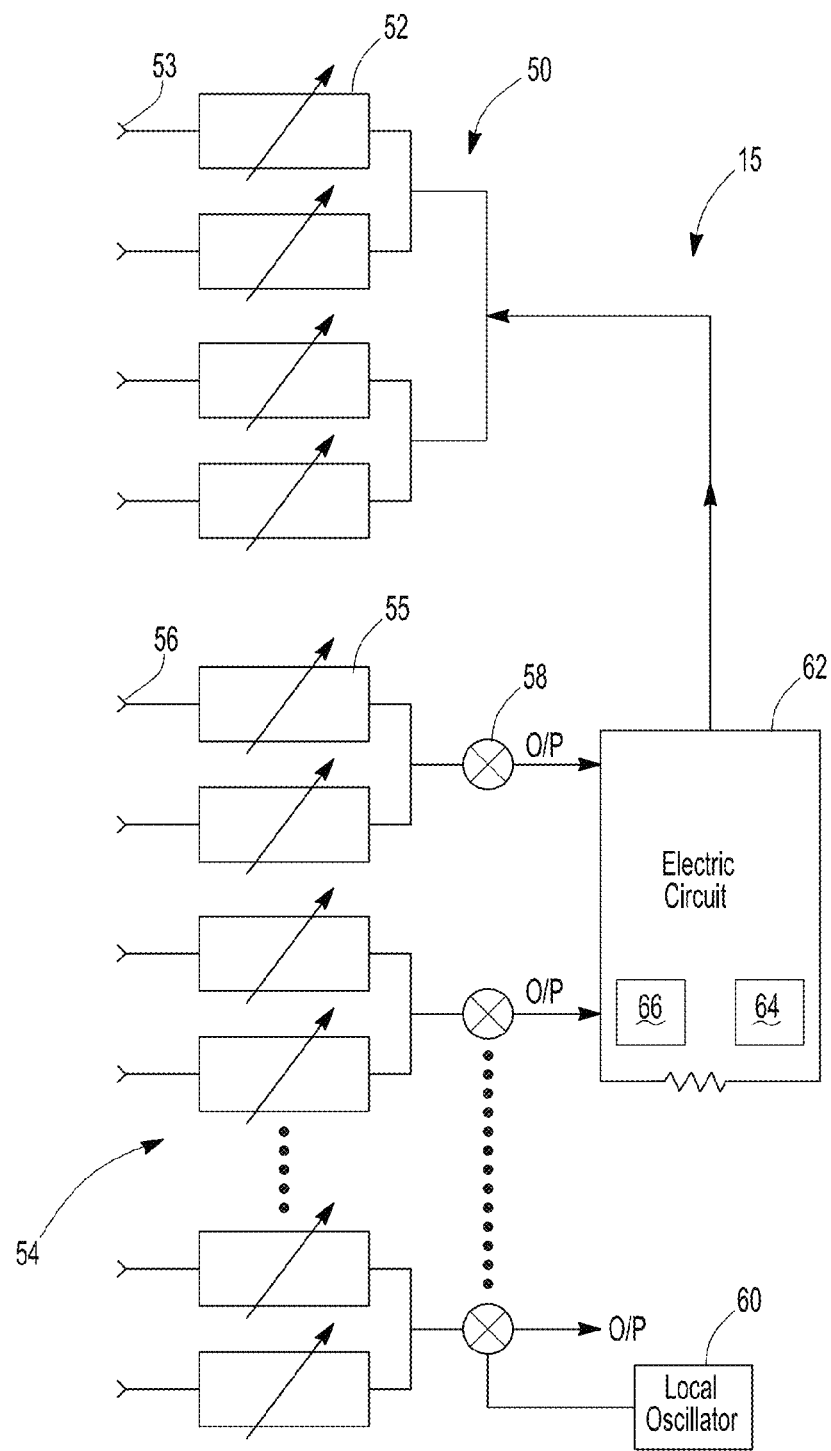
FIG. 4 is a schematic diagram of a radar apparatus according to an embodiment of the present invention.

With reference to FIG. 4, a schematic illustration of a radar apparatus according to an embodiment of the present invention is shown generally at reference numeral 15. The apparatus 15 has a transmit phased array 50 with one or more phase shifters 52 in electrical communication with one or more antenna elements 53. Similarly, the apparatus 15 has a receive phased array 54 with one or more phase shifters 55 in electrical communication with one or more antenna receiving elements 56. Although not shown, one or more amplifier elements can be located between each phase shifter 52, 55 and an associated transmit antenna element 53 or receiving antenna element 56. A local oscillator 60 that provides a local oscillator signal which is fed to a mixer 58 can also be included.

The exact electrical connection pattern is not shown in the figure; however, the local oscillator distribution network is typically configured such that the local oscillation signal arriving at each mixer 58 has the same phase and amplitude. In the alternative, a software adjustment in digital processing for phase offsets between the local oscillation signals can be provided. An electronic control circuit 62 can generate a plurality of beam density curves that are subsequently transmitted with the transmit phased array 50. In the alternative, the electronic control circuit 62 can have memory 64 which has a plurality of pre-calculated beam density curves. The electronic control circuit 62 can select one or more of the pre-calculated beam density curves and afford for a beam distribution to be transmitted through the one or more transmit antenna elements 52.

The electronic control circuit 62 may or may not have a beam density optimizer 66, e.g. in the form of an algorithm, that can calculate the beam density distribution for a particular sub-area within the FOV. In addition, the beam density optimizer 66 may or may not be stored in the memory 64. The beam density optimizer 66 can have a weighting function that is operable to weight, assign a weight and/or assign a weighted value to a first subset and/or second subset of sub-areas or zones within the FOV. The electronic control circuit 62 can also divide the FOV into the grid of sub-areas or zones 114 illustrated in FIGS. 2A and 3A.

Figure 5:
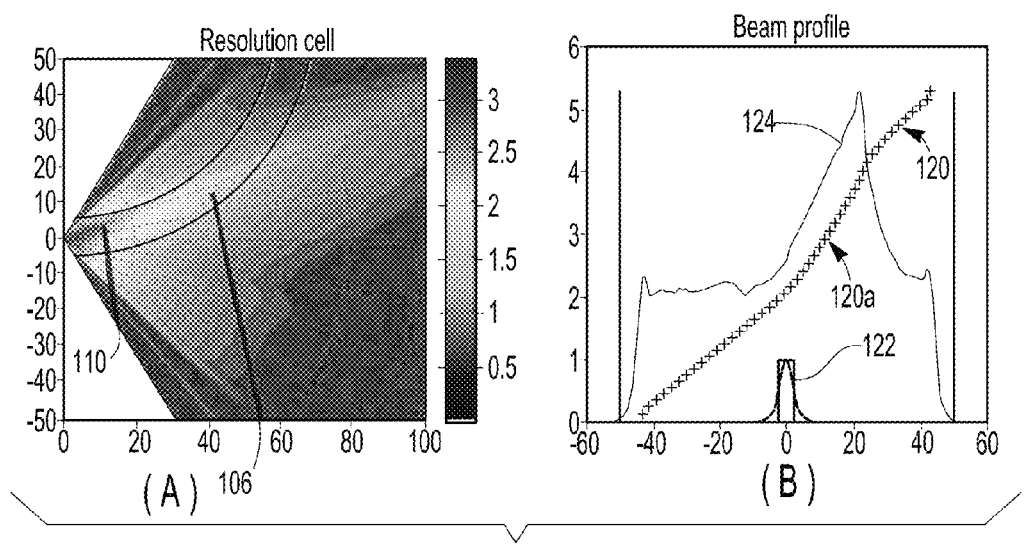
FIG. 5 is a graphical illustration of: (A) a resolution map for a radar apparatus according to an embodiment of the present invention in which increased resolution is shown for a portion of a curved road; and (B) beam distribution as a function of angle that provides for the increased resolution shown in (A)
Figure 6:
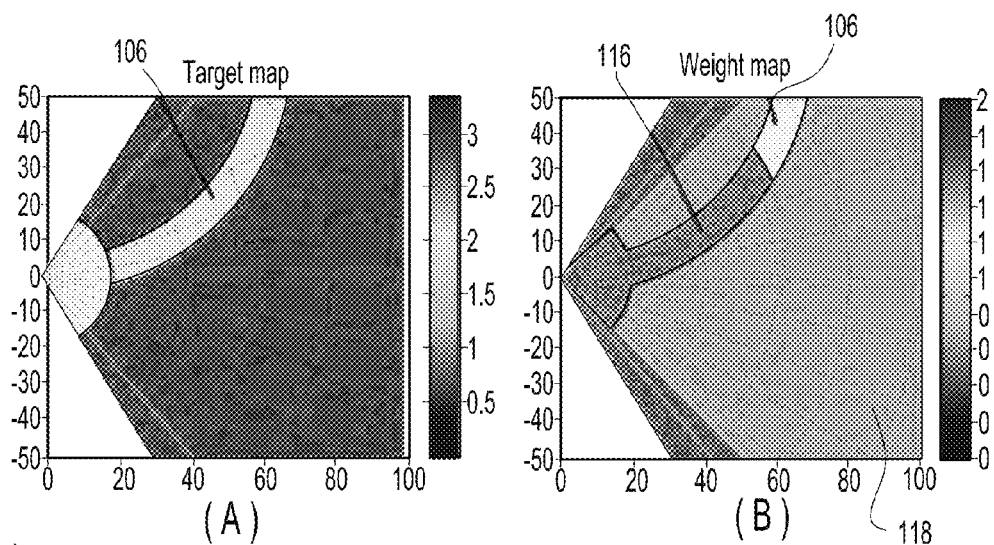
FIG. 6 is a graphical representation of: (A) a target map; and (B) a weight map for a radar apparatus according to an embodiment of the present invention.

Turning now to FIGS. 5 and 6, FIG. 5A provides a graphical representation of a resolution map for a curved portion of road 106, e.g. a portion of the road 106 that has a radius of curvature less than 10,000 feet. Also shown in FIG. 5A is high resolution area 110 that has been steered along or onto the curved portion of the road 106. Stated differently, the high resolution area 110 is located at an angle from an imaginary line extending perpendicular from the y-axis at the 0 degree point, which corresponds to the projected longitudinal center line 12 shown in FIG. 1B.

FIG. 5B illustrates the beam distribution and beam density for the resolution map shown in 5A. As shown by the graph, a relatively high beam density is provided in the region 120a which is approximately 5 to 30 degrees off center. In this manner, high resolution for one or more sub-areas within the radar FOV, but not located directly in front of motor vehicle 10 can be provided. In addition, FIGS. 6A and 6B illustrate a target map and weight map, respectively, in which beam density optimizer 66 provides weighting to sub-areas or zones that cover the curved portion of road 106 and affords for in the electronic control circuit 62 providing a relatively high density of steered transmit beams within the high resolution area 110. For example, FIG. 6B illustrates higher weighted zones 116 and lower weighted zones 118, the higher weighted zones 116 being targeted in FIG. 6A. In addition, the higher weighted zones 116 have a relatively high transmit beam density steered thereto as illustrated by beam distribution curve portion 120a shown in FIG. 5A.

Figure 7:
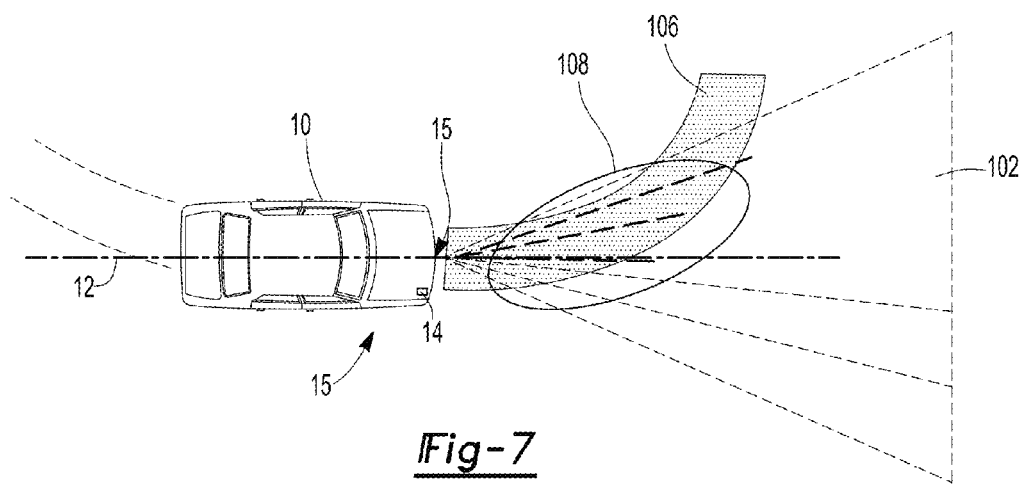
FIG. 7 is a schematic illustration of a motor vehicle with a radar apparatus according to an embodiment of the present invention and traveling on a curved road.

In operation, FIG. 7 illustrates the motor vehicle 10 traveling along the road 106, the road 106 being a curved road. The motor vehicle 10 can have a yaw rate sensor 14 that provides a yaw rate to the radar apparatus 15. The radar apparatus 15 then generates a beam density curve as a function of the yaw rate with a plurality of transmit beams transmitted from antennas 53 such that a high density of beams are provided within sub-area(s) 108. As such, high resolution is provided for a portion of a curved road that the motor vehicle 10 is traveling upon, the curved road portion being at an angle not equal to zero from the vehicle projected center line 12. In the alternative, the electronic control circuit 62 with memory 64 has a plurality of pre-calculated beam density curves, one or more of which are selected as a function of the yaw rate and used to generate and transmit the plurality of transmit beams that afford for the high resolution area 108.

Figure 8:
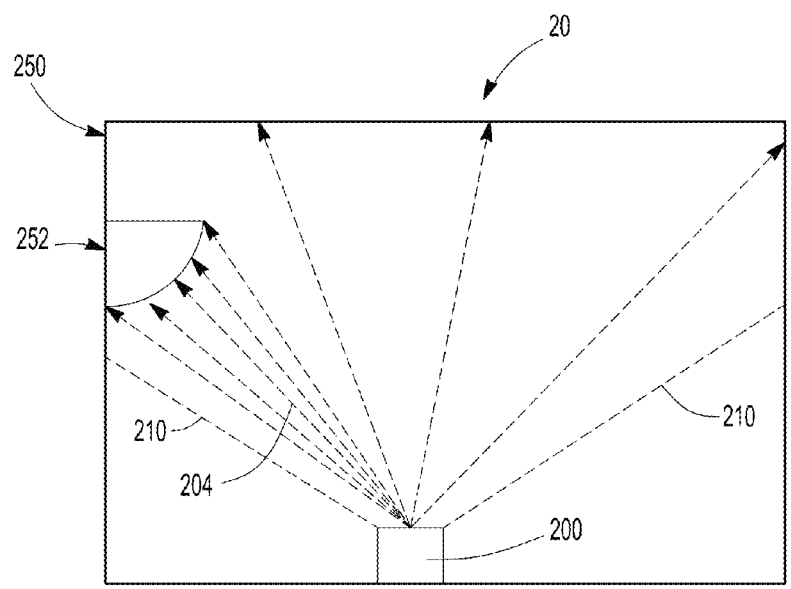
FIG. 8 is a schematic illustration of an enclosed area with an entry and/or exit that is monitored by a radar apparatus according to an embodiment of the present invention.

Turning now to FIG. 8, the radar apparatus 15 of the instant invention can also be used to monitor an area as shown generally at reference numeral 20. The area 20 may or may not be partially or totally enclosed by a boarder 250, wall, fence and the like. The area 20 has a radar apparatus 200 as discussed above, the apparatus 200 having a FOV defined by dotted lines 210. The area 20 also has an entry or exit 252 and the radar apparatus 200 provides an increased beam density 204 directed to the exit or entry area 252 in comparison with the remainder of the FOV. It is appreciated that the increased beam density 204 can be continuously directed towards the sub-area 252 or, in the alternative, directed to the area 252 upon detection of a target, e.g. an individual, entering or leaving the area 20.

Figure 9:
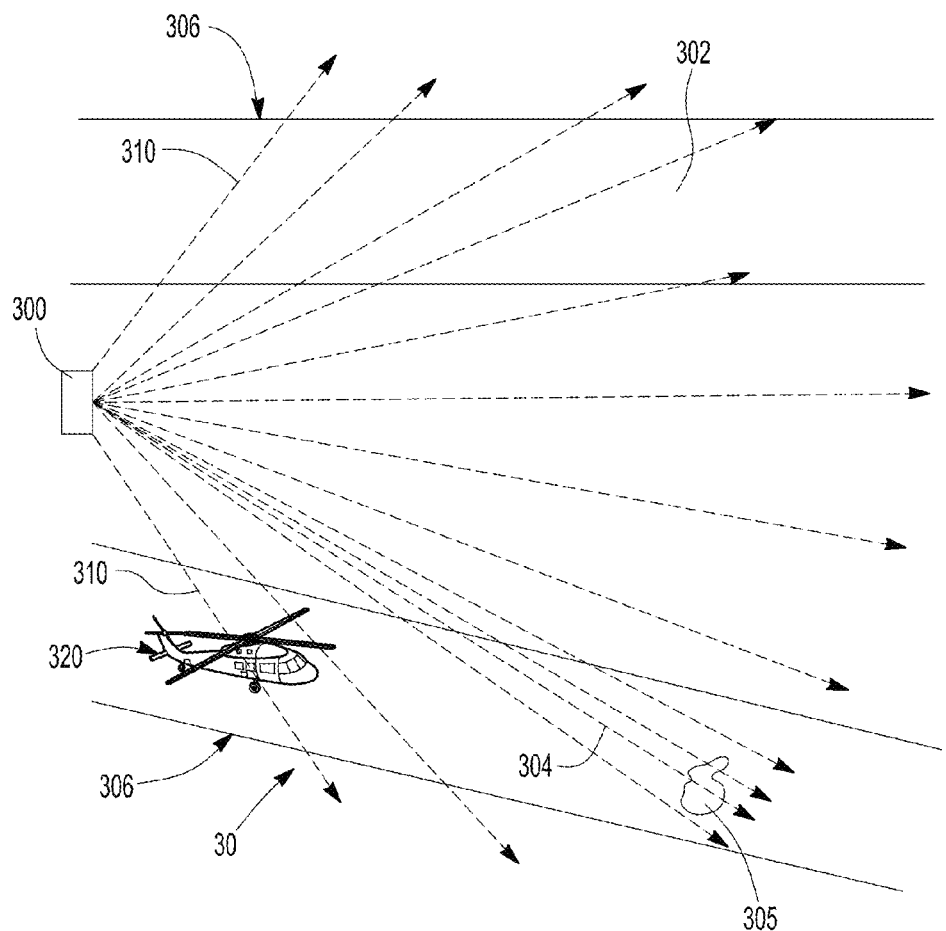
FIG. 9 is a schematic illustration of an airfield being monitored by a radar apparatus according to an embodiment of the present invention.

Finally, another embodiment of the radar apparatus is shown in FIG. 9 at reference numeral 30 which illustrates an airfield having a pair of runways 306. A radar apparatus 300 can have a FOV defined within the lines 310 in which portions 302 of the runways 306 are covered/monitored. Upon detection of a target 305, e.g. debris, the radar apparatus 300 can steer an increased beam density 304 to the target 305 for improved or higher resolution of the target. In this manner, it can be determined if the target 305 should be removed before the runway 306 is used by an aircraft. In the alternative, the radar apparatus 300 can provide uniform coverage of the FOV during nonuse time periods and then focus or steer a high density of beams along a particular runway prior to arrival of an aircraft 320. In this manner, increased safety, maintenance, and the like can be provided.

It is understood that various modifications can be readily made to the embodiments of the present invention described herein without departing from the scope and spirit thereof. Accordingly, it is understood that the invention is not to be limited by the specific illustrated embodiments but by the scope of the appended claims.

We claim:

1. A radar apparatus comprising:
a phased array transmitter operable to generate a transmit beam within a field of view (FOV);
a phased array receiver operable to receive a receive beam reflected from within said FOV;
a radar controller having an electronic circuit and an electronic memory, said electronic memory having a plurality of pre-calculated beam density curves stored thereon;
said radar controller operable to execute each of said plurality of pre-calculated beam density curves and steer at least one transmit beam generated from an executed beam density curve towards a sub-area of said FOV.

2. The radar apparatus of claim 1, wherein said phased array transmitter transmits a plurality of transmit beams within said FOV as a function of said executed beam density curve with said radar controller steering a subset of said plurality of transmit beams towards said sub-area within said FOV.

3. The radar apparatus of claim 2, wherein said subset of steered transmit beams are generated from said executed beam density curve.

4. The radar apparatus of claim 3, wherein said subset of steered transmit beams provide an increased beam density at said sub-area within said FOV.

5. The radar apparatus of claim 4, wherein said sub-area is selected from the group consisting of an area of a curved road in front of a motor vehicle traveling thereon, an entrance to an enclosed area and an exit from an enclosed area.

6. The radar apparatus of claim 5, further comprising a beam density optimizer algorithm stored in said electronic memory, said beam density optimizer algorithm operable to calculate a beam density distribution for said sub-area.

7. The radar apparatus of claim 6, wherein said FOV is divided into a plurality of zones by said radar controller, said beam density optimizer algorithm having a weighting function operable to weight a first subset of said plurality of zones higher than a second subset of said plurality of zones.

8. The radar apparatus of claim 7, wherein said executed beam density curve is a function of said first subset of FOV zones.

9. The radar apparatus of claim 8, wherein said first subset of FOV zones have a target identified therewithin.

10. The radar apparatus of claim 9, wherein said radar controller executes a beam density curve and said phased array transmitter transmits a first subset of transmit beams evenly across said FOV and a second subset of transmit beams directed only to said first subset of FOV zones.

11. The radar apparatus of claim 10, further comprising a motor vehicle having said radar apparatus attached thereto.

12. The radar apparatus of claim 11, wherein said first subset of FOV zones cover a curved portion of a road said motor vehicle is traveling on, said curved portion located at an angle not equal to zero from a longitudinal center line of said motor vehicle.

13. The radar apparatus of claim 12, wherein said radar controller executes said beam density curve as a function of a yaw rate of said motor vehicle.

14. The radar apparatus of claim 13, wherein said pre-calculated beam density curves correspond to different radii curved roads said motor vehicle can travel on.

\* \* \* \* \*